United States Patent [19]
Herm

[11] Patent Number: 5,272,919
[45] Date of Patent: Dec. 28, 1993

[54] METHOD OF MEASURING LEVEL OF FILLING

[75] Inventor: Thomas Herm, Hohenstein, Fed. Rep. of Germany

[73] Assignee: VDO Adolf Schindling AG, Frankfurt am Main, Fed. Rep. of Germany

[21] Appl. No.: 862,351

[22] Filed: Apr. 2, 1992

[30] Foreign Application Priority Data

May 24, 1991 [DE] Fed. Rep. of Germany ....... 4117050

[51] Int. Cl.$^5$ .......................... G01F 23/24; G01F 25/00
[52] U.S. Cl. ...................................... 73/295; 73/304 R; 73/1 H
[58] Field of Search ...................... 73/295, 304 R, 1 H

[56] References Cited

U.S. PATENT DOCUMENTS

| | | | |
|---|---|---|---|
| 3,283,576 | 11/1966 | Halpin et al. | 73/295 |
| 4,163,391 | 8/1979 | Bezard et al. | 73/295 |
| 4,361,037 | 11/1982 | Hauschild et al. | 73/295 |
| 4,425,795 | 1/1984 | Albrecht et al. | 73/295 |
| 4,513,616 | 4/1985 | Bezard et al. | 73/295 |
| 4,640,127 | 2/1987 | Schneider | 73/295 |
| 4,825,383 | 4/1989 | Ory | 73/295 |
| 4,943,797 | 7/1990 | Steffenhagen | 73/295 |

FOREIGN PATENT DOCUMENTS

| | | |
|---|---|---|
| 0102080 | 3/1984 | European Pat. Off. |
| 0249521 | 12/1987 | European Pat. Off. |
| 3543153 | 4/1987 | Fed. Rep. of Germany |

*Primary Examiner*—William A. Cuchlinski, Jr.
*Assistant Examiner*—Diego F. F. Gutierrez
*Attorney, Agent, or Firm*—Martin A. Farber

[57] ABSTRACT

A method for measuring the level of filling, such as the level of oil in an automotive engine, employs a hot-wire measuring device in which a hot-wire transmitter (5) is charged with a predetermined constant current, and an increase in voltage over the hot-wire transmitter is detected within a predetermined period of time. Errors due to digitizing and inaccurate calibration are avoided by the simplest possible means. For this purpose, a current source (1), which is controlled by an input voltage, is used as a source of the constant current. Furthermore, in a preparatory stage, after an assembly of the hot-wire measuring device, an input voltage (PWM) is changed until, at an input-voltage value wherein the current source (1) produces the predetermined constant current (IK). The input-voltage value is used in subsequent measuring stages to control the source of current.

12 Claims, 1 Drawing Sheet

METHOD OF MEASURING LEVEL OF FILLING

FIELD AND BACKGROUND OF THE INVENTION

The present invention relates to a method of measuring level of filling by means of a hot-wire measuring device in which a hot-wire transmitter is charged with a predetermined constant current, and an increase in the voltage over the hot-wire transmitter is detected within a predetermined period of time.

Such hot-wire transmitters are used, in particular, in motor vehicles for measuring various filling levels, such as, for instance, the oil level in the engine of a motor vehicle. The current heats the hot wire, the heating being dependent also on the surrounding medium. The course of the heating differs in the case wherein the hot wire or a part thereof is surrounded by air from the case wherein the hot wire is surrounded by a fluid such as oil or gasoline. With increasing resistance, and with constant current, there is a continuously higher voltage drop over the hot-wire transmitter. The increase in voltage, i.e., the difference between the voltage in the unheated hot wire and that in the hot wire, upon heating for a predetermined period of time, then constitutes a measure of the extent to which the hot wire is immersed in the liquid to be measured and, thus, a measure of the filling level of the liquid.

Also in such a method of measuring level it is endeavored to digitally process the results obtained. There is a problem in this connection in that the results obtained frequently contain large inaccuracies. The inaccuracies result, on the one hand, from the fact that the resistances of different hot-wire transmitters vary, and on the other hand from the fact that the voltage increase is very slight as compared with the possibilities of resolution of the analog/digital converters required for a digital evaluation. If the voltage increase, starting from about 3 to 4V, is in the area of about 400 mV, but the analog/digital converter has a reference voltage of only 5V and a resolution of 8 bits, then each increment represents a value of about 19.5 mV. The entire measurement would then be effected with about 20 increments. If, in addition to such rough resolution, there are also uncertainties with respect to the hot-wire transmitter, then the measurement will be too inaccurate for many fields of use.

SUMMARY OF THE INVENTION

It is therefore an object of the present invention to provide a method of the above-indicated type which permits more precise measurement with simple means. According to the invention, this object is achieved in a method of the type indicated above wherein, as a source of the constant current, there is used a current source which is controlled by an input voltage. Furthermore, in a preparatory stage, after assembly of the hot-wire measuring device, the input voltage is changed until, at a specific input-voltage value, the current source produces the predetermined constant current. The input-voltage value is used in subsequent measurement stages for control of the source of current.

The measurement is thus divided into two stages, the first stage taking place immediately after manufacture. The hot-wire measuring device is, in a sense, calibrated. The input voltage produces a predetermined current which leads to the desired voltage drop in the hot-wire transmitter. In this way, differences in resistance between individual hot-wire transmitters and other circuit tolerances are eliminated, so that, in this case, a signal can be obtained which is the same for all hot-wire measuring devices.

The input-voltage value is advantageously stored digitally in the preparatory stage, and given off by a microprocessor in measurement stages in the form of a pulse-width modulated signal. The signal, after passing through a low-pass filter, is fed as input voltage of the source of current. The balancing of the hot-wire measuring device can therefore take place fully automatically. Adjustment work, for instance the adjusting of a potentiometer, is eliminated. The input voltage can be digitized in known manner and stored as digital word in the memory of the microprocessor. The microprocessor can then easily produce this voltage value again by giving off a pulse-width modulated signal. After low pass filtering, there remains a voltage which corresponds to the output voltage of the microprocessor multiplied by the pulse-duty factor of the pulse-width modulated signal. In this way, the input voltage can be reproduced very accurately.

This objective is achieved in a method of the above-indicated type wherein a measurement voltage is determined as a starting voltage value at a starting time. The starting voltage is stored and subtracted from the measurement voltage in a further course of the measurement. A difference between the starting voltage and the measurement voltage serves as a filling-level signal. In this way, the result is obtained that only the difference voltage, i.e., the signal which is actually of interest, need be processed. The virtual zero point, which is established by the starting voltage, is calculated from this.

In one preferred embodiment, the difference is formed in analog fashion and the filling-level signal is amplified in analog form before being outputted. Since only the difference is of interest as filling-level signal, it is sufficient to convert it from analog to digital format at the end of its processing. In order to be able completely to utilize the conversion range of an analog-digital converter, the signal is spread i.e., amplified, in analog manner. In this way it is possible to impart to the filling-level signal such a large modulation that the operating range of the analog-digital converter can be fully utilized. In an eight-bit analog-digital converter the resolution can then take place in 256 increments. The digitizing error then becomes negligibly small.

Before it is used to form the difference, the starting voltage value is preferably converted from analog to digital, stored digitally by means of the microprocessor, and converted from digital to analog under control of the microprocessor. By means of the microprocessor the starting voltage is therefore first determined, then stored, and used again for the further processing of the output signal of the hot-wire transmitter. In this way, hardware sample-hold elements can be avoided.

It is also advantageous that the microprocessor give off at the starting time a predetermined voltage value instead of the starting voltage value. As long as the microprocessor has not yet determined a starting voltage value, it would normally give off an undetermined value. This could lead to the falsifying of the starting voltage value. However, since the voltage value given off by the microprocessor at the starting time is known, the starting voltage value can be deduced from the value outputted and the known value.

This is particularly simple if the voltage is zero.

It is particularly advantageous that the same microprocessor be used for storing and for forming the input-voltage value, and for storing and forming the starting voltage value. In this way, the expense for components can be kept relatively small.

BRIEF DESCRIPTION OF THE DRAWING

With the above and other objects and advantages in view, the present invention will become more clearly understood in connection with the detailed description of the preferred embodiment when considered with the accompanying drawing, in which.

DETAILED DESCRIPTION OF THE PREFERRED EMBODIMENT

Figure 1:
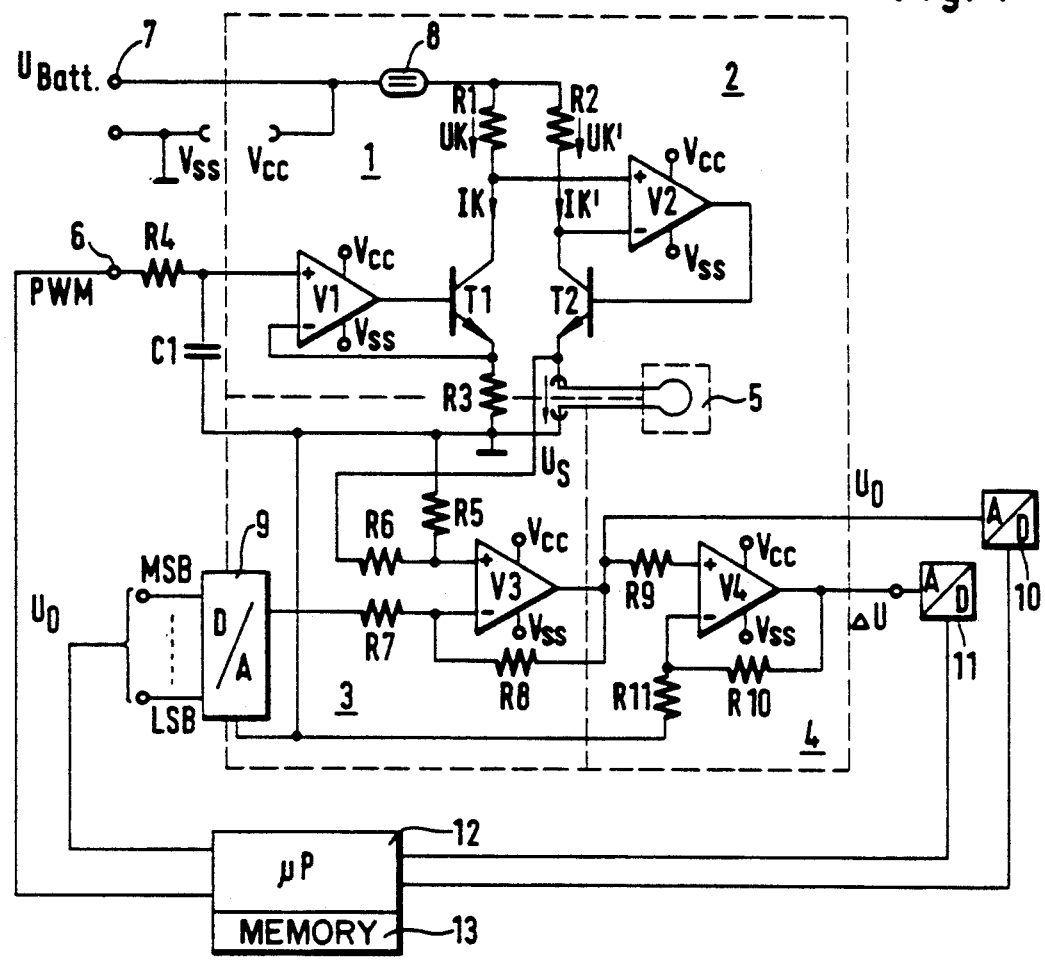
FIG. 1 is a circuit diagram.
Figure 2:
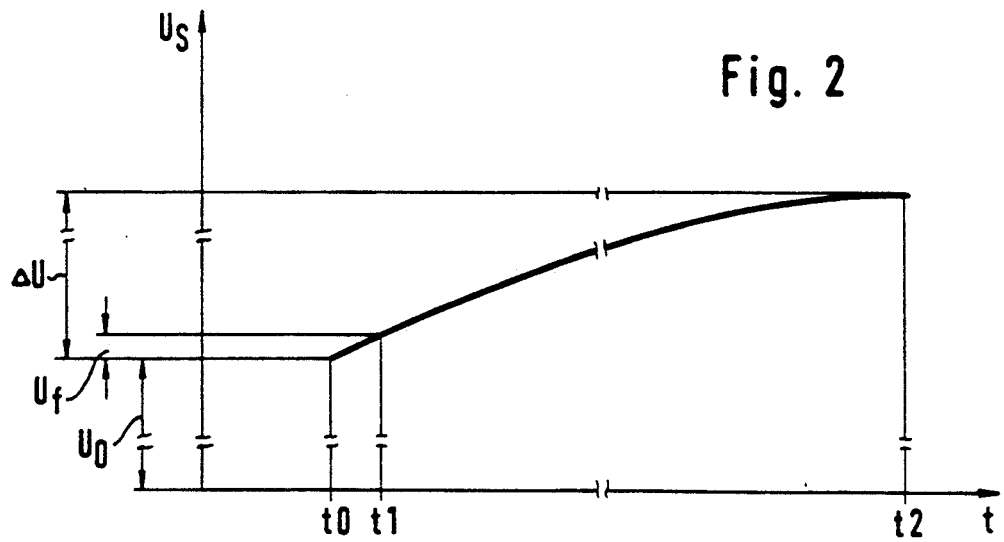
FIG. 2 shows diagrammatically a variation of the voltage.

A hot-wire measuring device has a voltage-controlled source of current 1, a current output stage 2, a subtraction stage 3, an amplifier stage 4, and a hot-wire transmitter 5.

The voltage-controlled current source 1 produces at its output a constant current, the level of which depends on an input voltage PWM at an input 6.

The voltage-controlled current source 1 has for this a battery connection 7 which is connected to a voltage source 8. A current source 8 is connected to a resistor R1, the other end of which is connected to the collector of a transistor T1. The emitter of the transistor T1 is connected to a resistor R3, the other end of which is connected to ground. The base of the transistor T1 is connected to an operational amplifier V1, the emitter of the transistor T1 being connected to the inverting input of the operational amplifier V1. The non-inverting input of the operational amplifier V1 is connected to the input 6 via a low-pass filter formed by a resistor R4 and a capacitor C1.

The current output stage 2 has an operational amplifier V2, the output of which is connected to the base of a transistor T2. The inverting input of the operational amplifier V2 is connected via a resistor R2 to the output of the current source 8, to which the resistor R1 is also connected. The non-inverting input of the operational amplifier V2 is connected to the collector of the transistor T1.

One terminal of the hot-wire transmitter wire 5 is connected to the emitter of the transistor T2 and the other terminal is connected to ground.

The subtraction stage 3 has an operational amplifier V3 the non-inverting input of which is connected on the one hand via a resistor R5 to ground and on the other hand via a resistor R6 to the emitter of the transistor T2. The inverting input of the operational amplifier V3 is connected via a resistor R7 to an output of a digital-analog converter 9. The output of the operational amplifier V3 is fed back via a resistor R8 to its inverting input.

The amplifier stage 4 has an operational amplifier V4, the non-inverting input of which is connected via a resistor R9 to the output of the operational amplifier V3 from the subtraction stage 3. The output of the operational amplifier V4 is fed back via a resistor R10 to the inverting input of the operational amplifier V4. The inverting input of the operational amplifier V4 is furthermore connected to ground via a resistor R11.

The output of the operational amplifier V3 is connected to a first analog-digital converter 10. The output of the operational amplifier V4 is connected to a second analog-digital converter 11. The outputs of the two analog-digital converters 10, 11 are connected to a microprocessor 112 which has a memory 113. The microprocessor 112 is connected on the one hand to the input 6 of the voltage-controlled current source 1, and, on the other hand, to the input of the digital-analog converter 9.

All operational amplifiers are supplied with voltage via supply terminals $V_{cc}$ and $V_{ss}$. As indicated in FIG. 1, battery voltage is essentially present over these terminals.

The hot-wire measuring device operates as follows:

The microprocessor 12 produces a pulse-width modulated voltage signal which is fed, via the low-pass filter formed by R4 and C1, to the non-inverting input of the operational amplifier V1. The operational amplifier V1 controls the transistor T1 in such a manner that a voltage is obtained over the resistor R3 which corresponds to that present at the non-inverting input of the operational amplifier V1. This voltage is caused by a current IK which is present as a result of the input voltage PWM at the input 6 of the voltage-controlled current source. The current IK can be varied by variation of the voltage PWM at the input 6.

The voltages which are present at the collectors of the transistors T1 and T2 are fed to the two inputs of the operational amplifier V2. The operational amplifier V2 therefore controls the transistor T2 in such a manner that the same voltage is present at its collector as is present at the collector of the transistor T1. The transistor T2 is so controlled that a voltage drop UK' results on the resistor R2, which drop corresponds precisely to the voltage drop UK on the resistor R1. This current has the value IK' The current IK' is conducted through the hot-wire transmitter 5 and causes a voltage drop $U_s$ across the hot-wire transmitters.

In a preparatory stage, after the hot-wire measuring device has been assembled with the hot-wire transmitter 5, the voltage $U_s$ is measured over the hot-wire transmitter. The input voltage PWM is then varied until a predetermined voltage is established under predetermined conditions such as temperature. The input voltage PWM is varied for instance by means of the microprocessor 12. The micro-processor 12 supplies the input of the digital-analog converter 9 with the value zero. At the output of the operational amplifier V3 a voltage UO can then be tapped off which corresponds to the voltage $U_s$. This voltage is then fed back again via the analog-digital converter 10 to the microprocessor 12. The microprocessor 12 varies the voltage PWM until voltage UO corresponds to a desired voltage UOSoll. When this value has been reached, the voltage PWM is stored in the memory 13. Stated more accurately, a number which characterizes the pulse-duty factor employed for producing the pulse-width modulated voltage PWM is stored in the memory 13.

If the pulse-width modulated voltage has been stored, the balancing has been effected, i.e., the same signal always appears at the output even in the case of different hot-wire transmitters 5. The memory 13 is a non-volatile memory, for instance an EEPROM.

In later measuring stages the current IK' is impressed on the hot-wire transmitter 5 at a time tO. At this time the microprocessor 12 gives off a signal to the digital-analog converter 9 which represents the voltage zero.

The digital analog converter 9 therefore gives off at its output the voltage zero. At the output of the operational amplifier V3, there then results the resultant voltage UO which corresponds to the voltage $U_s$ over the hot-wire transmitter 5. This is the so-called starting voltage UOMESS. The voltage UO is fed via the analog-digital converter 10 to the microprocessor 12, which stores it in the memory 13 and feeds it in subsequent cycles to the digital-analog converter 9. As from the time t1, the voltage UO is therefore fed to the inverting input of the operational amplifier V3. At the output of the operational amplifier V3 there then appears merely the difference between the voltage $U_s$ and the starting voltage UOMESS. This voltage is amplified in the operational amplifier V4, the amplification factor V being in this connection equal to $1 + R10/R11$. The voltage $\Delta U$ then appears at the output of the operational amplifier V4. This voltage $\Delta U$ is digitized by means of the analog-digital converter 11 and fed to the microprocessor 12 for further evaluation. The further evaluation may consist, for instance, of a display.

The amplification of the operational amplifiers V1, V2, V3 and V4 and the range of resolution of the analog-digital converters 10, 11 and of the digital-analog converter 9 is limited by the supply voltage $U_{Batt}$. Due to the fact that there appears at the output of the subtraction stage 3 only the signal which is still of interest, namely the difference between the voltage $U_s$ over the hot-wire transmitter 5 and the starting voltage UOMESS over the hot-wire transmitter 5, and since this difference is amplified to such an extent that it fully utilizes the operating range of the analog-digital converter 11, there is obtained a substantially improved resolution of the signal produced by the hot-wire transmitter 5. The voltage $\Delta U$ is determined at a time t2. In the period between t0 and t2, for instance within 2 seconds, the voltage has risen from the starting value UOMESS to a value UOMESS $+\Delta U$. This $\Delta U$ can be evaluated with great precision, so that quite reliable information can be obtained as to the filling level determined by the hot-wire transmitter 5. Since, furthermore, a balancing which absorbs all variations between different hot-wire transmitters has already taken place in the preparatory stage, an output signal of high precision can be obtained. Since both the balancing and the measuring can take place under the control of the microprocessor 12, the method can also be carried out with relatively simple means.

I claim:

1. A method of measuring level of filling by means of a hot-wire measuring device having a hot-wire transmitter, comprising
   charging the hot-wire transmitter with a predetermined constant current, the charging producing an initial value of measurement voltage developed over the hot-wire transmitter;
   detecting an increase in the measurement voltage developed over the hot-wire transmitter from said initial value within a predetermined period of time, the increase in the voltage serving as a measure of the filling level of a fluid;
   employing a source of constant current controllable by an input voltage, to provide the constant current in said charging; and
   in a preparatory stage, after assembly of the hot-wire measuring device, adjusting the input voltage to obtain a value of the constant current for making said initial value of measurement voltage equal to a reference value of voltage, and storing the value of the input voltage for use in measurements of filling level to be performed subsequent to said preparatory stage.

2. A method according to claim 1, wherein
   said storing of a value of the input voltage to the current source is accomplished digitally in the preparatory stage, the input voltage being outputted by a microprocessor, during the measuring of the level of filling, in the form of a pulse-width modulated signal; and
   said method comprises a step of passing the input voltage through a low-pass filter to the source of current.

3. A method of measuring level of filling by means of a hot-wire measuring device having a hot-wire transmitter, comprising
   charging the hot-wire transmitter with a predetermined constant current, the charging producing an initial value of measurement voltage developed over the hot-wire transmitter;
   employing a source of constant current controllable by an input voltage, to provide the constant current in said charging; and
   in a preparatory stage, after assembly of the hot-wire measuring device, adjusting the input voltage to obtain a value of the constant current for making said initial value of measurement voltage equal to a reference value of voltage, and storing the value of the input voltage for use in measurements of filling level to be performed subsequent to said preparatory stage; wherein
   said storing of a value of the input voltage to the current source is accomplished digitally in the preparatory stage, the input voltage being outputted by a microprocessor, during the measuring the level of filling, in the form of a pulse-width modulated signal;
   said method further comprises passing the input voltage through a low-pass filter to the source of current;
   selecting a value of the measurement voltage obtained in a course of measurement of the filling level to serve as a starting voltage at a starting time;
   storing a value of the starting voltage;
   subtracting the starting voltage from a second measurement voltage obtained in a further course of measurement; and
   outputting a difference between the starting voltage and the second measurement voltage to serve as filling-level signal.

4. A method according to claim 3, wherein, in said subtracting step, the difference is formed in analog fashion and the filling-level signal is amplified in analog form before being outputted.

5. A method according to claim 3, wherein,
   prior to said step of storing the starting voltage, there is a step of converting the starting voltage from analog to digital format; and
   prior to said subtracting step, there is a step of converting the starting voltage from digital to analog format under control of the microprocessor, said storing step being accomplished by digital storage under control of the microprocessor.

6. A method according to claim 3, wherein aid selecting step is accomplished by, at the starting time, outputting a predetermined voltage value by the microprocessor to serve as the starting voltage.

7. A method according to claim 6, wherein said predetermined voltage value is zero.

8. A method according to claim 6, further comprising the steps of forming the input voltage to said current source by use of said microprocessor, and forming the starting voltage by use of said microprocessor; and wherein the same microprocessor is used also in said steps of storing the input-voltage value and storing the starting voltage value.

9. A method of measuring level of filling by means of a hot-wire measuring device having a hot-wire transmitter, comprising charging the hot-wire transmitter with a predetermined constant current, the charging producing an initial value of measurement voltage developed over the hot-wire transmitter;

employing a source of constant current controllable by an input voltage, to provide the constant current in said charging; and in a preparatory stage, after assembly of the hot-wire measuring device, adjusting the input voltage to obtain a value of the constant current for making said initial value of measurement voltage equal to a reference value of voltage, and storing the value of the input voltage for use in measurements of filling level to be performed subsequent to said preparatory stage; wherein the method further comprises selecting a value of the measurement voltage obtained in a course of measurement of the filling level to serve as a starting voltage at a starting time;

storing a value of the starting voltage;

subtracting the starting voltage from a second measurement voltage obtained in a further course of measurement; and outputting a difference between the starting voltage and the second measurement voltage to serve as fillinglevel signal.

10. A method of measuring the level of filling of a container with fluid by immersion of a hot-wire transmitter in the fluid, comprising the steps of:

establishing a reference voltage;

calibrating the transmitter by impressing a calibration electric current through the transmitter, a first value of voltage drop appearing across the transmitter in response to a flow of the current through the resistance of the transmitter, said calibrating including a step of adjusting a value of the calibration current to a calibration value wherein the first value of voltage drop equals the reference voltage;

storing the calibration value;

immersing the transmitter in the fluid;

energizing the transmitter with current at the calibration value for a predetermined period of time;

detecting a second value of voltage drop of the transmitter at the end of said predetermined time period to obtain a measured voltage, the second value of voltage drop depending on the filling level;

subtracting the reference voltage from the measured voltage to obtain a difference voltage; and measuring the difference voltage to obtain a measure of the filling level.

11. A method according to claim 10, wherein said calibrating employs a pulse-width modulated (PWM) signal for adjusting the value of the calibration current, said storing is accomplished as a digital storing of the calibration value, and said measuring of the difference voltage is accomplished digitally by analog-to-digital conversion means.

12. A method according to claim 11, further comprising a step of employing a digital computer means with a memory to activate said calibrating and to perform said storing, said computer means being responsive to signals of said conversion means for performance of said step of adjusting the value of the calibration current.

* * * * *